United States Patent [19]
Grawey et al.

[11] 3,843,764
[45] Oct. 22, 1974

[54] METHOD OF MAKING A NON-CURING GASKET FOR OPPOSED SURFACES

[75] Inventors: Charles E. Grawey, Peoria, Ill.;
Kenneth D. Probert, Phoenix, Ariz.

[73] Assignee: Caterpillar Tractor Co., Peoria, Ill.

[22] Filed: Sept. 23, 1971

[21] Appl. No.: 183,208

Related U.S. Application Data

[63] Continuation of Ser. No. 41,703, May 26, 1970, abandoned, which is a continuation of Ser. No. 775,692, Nov. 14, 1968, abandoned.

[52] U.S. Cl. .................. 264/330, 106/33, 156/329, 161/207, 264/319
[51] Int. Cl. ......... B29b 3/02, B29c 3/00, C09k 3/10
[58] Field of Search ............ 156/329; 161/206, 207; 106/33; 264/89, 330, 319

[56] References Cited
UNITED STATES PATENTS

| | | | |
|---|---|---|---|
| 2,504,388 | 4/1950 | Braley | 161/206 |
| 2,639,276 | 5/1953 | Smith | 156/329 |
| 2,692,844 | 10/1954 | Hyde | 156/329 |
| 2,736,721 | 2/1956 | Dexter | 156/329 |
| 2,860,083 | 11/1958 | Nitzsche | 156/329 |
| 3,031,366 | 4/1962 | Bueche et al. | 156/329 |
| 3,437,554 | 4/1969 | Gamble | 156/329 |
| 3,527,842 | 9/1970 | Clark | 161/207 |

*Primary Examiner*—Donald J. Arnold
*Attorney, Agent, or Firm*—Phillips, Moore, Weissenberger, Lempio & Strabala

[57] ABSTRACT

A liquid gasket material suitable for use between two metal members within a high temperature environment and comprising a non-curing silicone gun. Solvent is included in the liquid gasket material to establish a proper consistency during installation.

4 Claims, 1 Drawing Figure

PATENTED OCT 22 1974
3,843,764
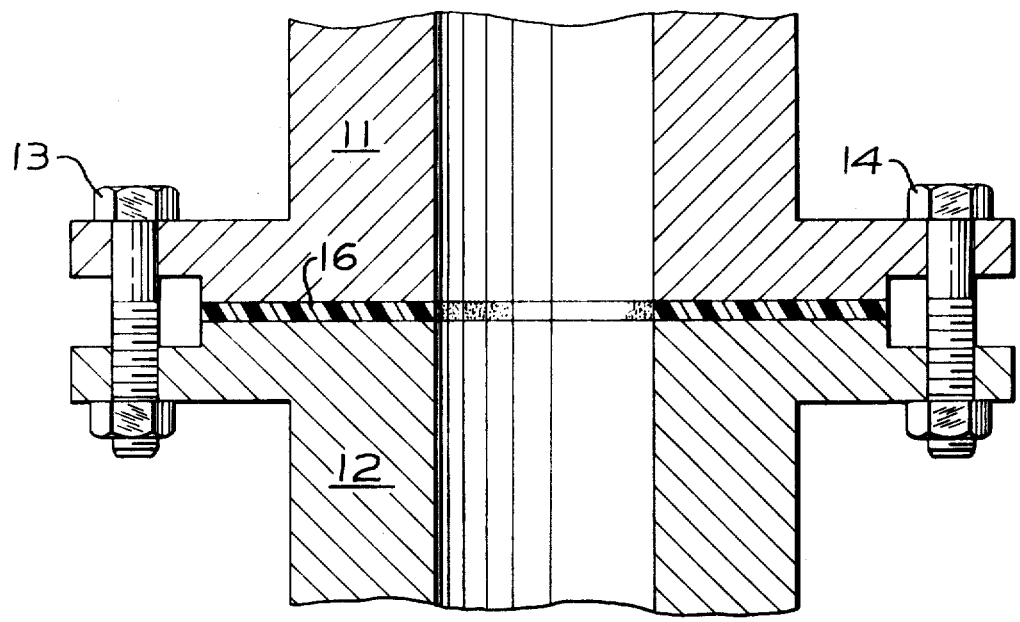
INVENTORS
CHARLES E. GRAWEY
KENNETH D. PROBERT
ATTORNEYS

METHOD OF MAKING A NON-CURING GASKET FOR OPPOSED SURFACES

CROSS-REFERENCE TO RELATED APPLICATIONS

This is a Continuation of application Ser. No. 41,703 filed May 26, 1970 which is a Continuation of application Ser. No. 775,692, filed Nov. 14, 1968 and both now abandoned.

The present invention relates to a high temperature liquid gasket and more particularly to such a gasket material which comprises at least a non-curing silicone gum.

The problem overcome by the present invention is that of providing a suitable liquid gasket material which may be deposited between two metal members subject to high temperatures wherein the liquid gasket will remain effective within the high temperature environment. The liquid gasket of the present invention is particularly contemplated for use as a seal between two metal members within a gas turbine engine which may commonly develop operating temperatures as high as approximately 400° to 500° F. In addition to providing a seal and withstanding the high temperature of the engine environment, it is further desirable that the liquid gasket permit rapid disassembly of the components within the gas turbine engine. This is necessary or at least desirable, for example, when the engine is to be disassembled for repairs or overhaul.

Accordingly, it is an object of the present invention to provide a liquid gasket material suitable for use in high temperature environments.

It is a further object to provide such a liquid gasket material which may be deposited between the members to provide an effective seal while permitting rapid disassembly of the sealed members.

An additional advantage of the liquid gasket material of the present invention lies in the fact that the deposited liquid gasket may be redissolved and reused, for example, upon reassembly of the two members.

The present invention is described at least partially with respect to the drawing which shows the liquid gasket material deposited between two metal members of a gas turbine engine.

The invention is described with reference to the drawing wherein metal members 11 and 12 are components of a gas turbine engine. The components of such an engine may be subject to operating temperatures of as high as approximately 400° to 500° F. The two members 11 and 12 are secured together by means such as the bolts indicated at 13 and 14. The present invention relates to a novel liquid gasket for forming a seal within the area indicated at 16 and defined by the interface of the two members 11 and 12.

Novelty of the present invention resides in the use of a non-curing silicone gum as a basic component within the liquid gasket material 16 absent any curing agents which would cure or harden the gum and cause substantial adhesion to the adjacent surfaces of the members 11 and 12. A suitable solvent is also employed within the liquid gasket material to establish a desired consistency or viscosity while the gasket material is being installed in place.

The silicone gum employed within the liquid gasket material preferably has a molecular weight of at least approximately 100,000. One silicone gum which may be employed is dimethylvinylsiloxane having a molecular weight range of approximately 100,000 to 1,000,000. A siloxane gum of this type is highly viscous and may have a specific gravity of approximately 1.44. Commercially available varieties of such siloxane gums may commonly include fillers, for example, of the silica type, which are already milled into the gum. This material is available from the Dow Corning Company under the trade name Silastic 797U. Other silicone gums which may be employed in the present invention include dimethylsiloxane, diphenylsiloxane, methylphenylsiloxane, phenylvinylsiloxane, as well as fluorosilicones.

A preferred composition of the liquid gasket material preparatory to its deposition within an environment such as the interface between the two members of 11 and 12 includes the siloxane gum referred to above. A suitable solvent is employed within the liquid gasket material to establish a proper consistency or viscosity as desired to facilitate deposition. 1,1,1-trichloroethane is a preferred solvent because of its non-flammable characteristics. Other solvents employable in the gasket material include methyl ethyl Ketone, trichloroethylene, ethylene dichloride, benzene and xylene, for example. The solvent to be employed in the gasket material may be generally characterized as a high aromatic content, petroleum base compound.

Additional pigment may also be employed as desired within the composition. Iron oxide is a preferred pigmenting agent employed within the liquid gasket composition because of its high temperature stability. Lead chromate is also a suitable pigment.

In preparing the preferred liquid gasket material, five parts by weight of iron oxide pigment are completely milled into 150 parts by weight of dimethylvinylsiloxane gum. The pigmented gum is then placed in solution in 60 parts by weight of 1,1,1-trichloroethane. The liquid gasket material is applied to the cleaned interface surfaces of the members 11 and 12 by brush or spray application while a semi-liquid state. The solvent is removed from the deposited gasket material, as by heating, to prevent vaporization of the solvent from interfering with sealing characteristics of the deposited gasket.

The present liquid gasket composition provides a novel sealing material for use within high temperature environment such as that referred to above. The gasket material may be readily removed from the surfaces of the members 11 and 12 to permit disassembly of those components. Further, the liquid gasket material may be redissolved, for example, by the use of additional solvent to reestablish its desired consistency. The redissolved liquid gasket material may then be reused, for example, upon reassembling of the gas turbine engine components 11 and 12.

What is claimed is:

1. The method of making a high temperature non-curing gasket for opposed surfaces comprising applying to at least one of the surfaces a solution of a polysiloxane gum, selected from the group consisting of polymers of dimethyl vinyl siloxane, dimethyl siloxane, diphenyl siloxane, methyl phenyl siloxane, and phenyl vinyl siloxane, said gum having a molecular weight of at least about 100,000, dissolved in an organic solvent therefor, removing said solvent by evaporation, and placing said opposing surfaces in opposed relationship, wherein said gum remains uncured.

2. The method of claim 1 wherein said polysiloxane is poly (dimethyl vinyl siloxane) having a molecular weight of from about 100,000 to 1,000,000.

3. The method of claim 1 wherein said solvent for said polysiloxane gum is selected from the group consisting of 1,1,1-trichloroethane, methyl ethyl ketone, trichlorethylene, ethylene dichloride, benzene, and xylene.

4. The method of claim 1 wherein said solvent for said polysiloxane gum is 1,1,1-trichlorethane.

* * * * *